(12) United States Patent
van Klooster

(10) Patent No.: US 7,973,453 B2
(45) Date of Patent: Jul. 5, 2011

(54) ULTRASONIC TRANSDUCER

(75) Inventor: Jereon Martin van Klooster, Tiel (NL)

(73) Assignee: Krohne AG, Basel (CH)

( * ) Notice: Subject to any disclaimer, the term of this patent is extended or adjusted under 35 U.S.C. 154(b) by 190 days.

(21) Appl. No.: 12/503,356

(22) Filed: Jul. 15, 2009

(65) Prior Publication Data
US 2010/0011866 A1      Jan. 21, 2010

(30) Foreign Application Priority Data

Jul. 15, 2008   (DE) .......................... 10 2008 033 098

(51) Int. Cl.
*H01L 41/08*     (2006.01)
*H04R 1/44*      (2006.01)
(52) U.S. Cl. ........................................................ 310/334
(58) Field of Classification Search ................... 310/334, 310/322, 338, 328, 311, 348; 367/188; 73/644, 73/861.24, 861.25; *H01L 41/08; H04R 1/44*
See application file for complete search history.

(56) References Cited

U.S. PATENT DOCUMENTS

| 4,770,038 A * | 9/1988 | Zuckerwar et al. ........... 310/338 |
| 6,584,862 B1 * | 7/2003 | Molenaar .................... 73/861.27 |
| 6,799,475 B2 * | 10/2004 | van Klooster .............. 73/861.24 |

* cited by examiner

*Primary Examiner* — Walter Bneson
*Assistant Examiner* — Karen Addison
(74) *Attorney, Agent, or Firm* — Roberts Mlotkowski Safran & Cole, P.C.; David S. Safran

(57) ABSTRACT

An ultrasonic transducer with a housing having an ultrasonic window in a first region of the housing for transmitting ultrasonic waves, and a transducer element located in the housing adjacent to the ultrasonic window. To prevent ultrasonic waves from being transmitted as housing waves between the first region of the housing, by way of at least one intermediate second region of the housing, to a third region of the housing on opposite side of the second region from the first region, in the second region of the housing, at least two weakly coupled mechanical resonators are provided which are arranged essentially in secession in the propagation direction of the housing waves.

11 Claims, 4 Drawing Sheets

ULTRASONIC TRANSDUCER

BACKGROUND OF THE INVENTION

1. Field of Invention

The invention relates to an ultrasonic transducer with a housing, an ultrasonic window provided in a first region of the housing for transmitting ultrasonic waves between the interior of the ultrasonic transducer and the exterior of the ultrasonic transducer, and a transducer element located in the housing adjacent to the ultrasonic window, in which ultrasonic waves can be transmitted as housing waves between the first region of the housing by way of at least one intermediate second region of the housing and a third region of the housing which is opposite the first region of the housing.

2. Description of Related Art

Ultrasonic transducers of the aforementioned type have been known for years and are used, for example, to a large extent in acoustic flow rate measurement devices. The transducer element of the ultrasonic transducer converts electrical energy into a mechanical deflection, with suitable excitation also into an oscillation in the ultrasonic range. In this case, the ultrasonic transducer works as an ultrasonic transmitter and the ultrasonic waves are transmitted partially by way of the ultrasonic window into the medium which surrounds the ultrasonic transducer.

Conversely, it is also possible for the ultrasonic window to be deflected by external pressure fluctuations which occur in the medium and for the deflection to be converted by the transducer element into a corresponding signal; in this case, the ultrasonic transducer works as an ultrasonic receiver. In many applications, such as, for example, in fill level measurement, such an ultrasonic transducer is used both as an ultrasonic transmitter and an ultrasonic receiver. In the field of flow rate measurement, an ultrasonic transducer is often used either as an ultrasonic transmitter or as an ultrasonic receiver.

In both cases, therefore, both in the case in which the ultrasonic transducer works as a transmitter and also in the case in which the ultrasonic transducer works as a receiver, the ultrasonic waves, which have been transmitted by way of the ultrasonic window and which reach the transducer element or originate from the transducer element, are the actual useful signal of interest. The initially described ultrasonic waves which are relayed or diverted by way of the housing are parasitic housing waves. The energy transmitted with these waves is not available to the useful signal. Therefore, housing waves are generally undesirable.

There are various measures for reducing the housing waves. Some measures relate to the object of avoiding formation of these housing waves. They include, for example, certain configurations of the ultrasonic window with respect to especially good impedance matching for maximizing the transmitted energy portion or with respect to design of the ultrasonic window as a $\lambda/4$ layer for reducing reflections. Other measures relate to preventing already formed housing waves from being relayed, for example, by mismatched acoustic impedance transitions. However, housing waves constitute not only power lost for the useful signal, but moreover, they can have other adverse effects.

In acoustic flow rate measurement, for example, the effect is generally used that, in a medium transported in a measurement tube, the transport velocity of the medium is superimposed on the propagation velocity of the acoustic signal. The measured propagation velocity of the acoustic signal relative to the measurement tube is therefore larger than in a medium at rest. When the medium is being transported in the direction of the acoustic signal, the velocity of the acoustic signal relative to the measurement tube is less than in a medium at rest or when the medium is being transported opposite to the emission direction of the acoustic signal. The transit time of the acoustic signal between the acoustic transmitter and the acoustic receiver—both are ultrasonic transducers—as a result of the entrainment effect depends on the transport velocity of the medium relative to the measurement pipe, and thus, relative to the acoustic transmitter and the acoustic receiver.

In measurements which are based on emitted acoustic or ultrasonic signals, not only in the field of flow rate measurement, the problem is that the ultrasonic oscillations produced by the transducer element are transmitted not only by way of the ultrasonic window of the transducer housing into the surrounding medium of the ultrasonic transducer, but that the generated ultrasonic oscillations are transmitted in part also by way of the housing as housing waves to the entire measurement device. In addition to power loss, this is a problem since the ultrasonic waves transmitted by so-called crosstalk to the housing of the measurement device can also lead to considerable reception side interference. This is due to the fact that, on the receiving side it, cannot be easily distinguished whether the received ultrasonic signals have been received directly by way of the medium and the ultrasonic window—useful signal—or have traveled indirectly as housing waves by way of the measurement device and the entire housing of the ultrasonic transducer, especially therefore by way of the third region of the housing and the intermediate second region of the housing to the transducer element.

SUMMARY OF THE INVENTION

Therefore, a primary object of this invention is to devise an ultrasonic transducer which implements a further measure for preventing the transmission of housing waves by way of the housing of the ultrasonic transducer and which at least partially avoids the disadvantages known from the prior art.

The ultrasonic transducer in accordance with the invention in which the aforementioned object is achieved is characterized, first of all, essentially in that at least two weakly coupled mechanical resonators are provided in the second region of the housing and which are arranged essentially in secession in the propagation direction of the housing waves.

The configuration of the ultrasonic transducer and of the second region of the housing of the ultrasonic transducer in accordance with the invention entails various advantages. The mechanical resonators, first of all, make it possible to locally "capture" the energy transported by the ultrasonic waves, specifically by excitation of the mechanical resonators to oscillation. Mechanical resonators can conventionally be described as spring-mass systems. In real spring-mass systems the property of the spring—specifically the action of a force dependent on deflection—cannot be implemented without making a contribution, even if very small, to the mass of the resonator, in exactly the same way as a mass due to its mechanical placement in the resonator also always influences the spring property of the spring-mass system. The spring and mass are mechanically in fact not completely separable from one another. Series arrangement of at least two mechanical resonators in the propagation direction of the housing waves results in that the housing waves must traverse all resonators in order to travel from the first region of the housing to the third region of the housing and vice versa. The weak coupling of the two resonators results in that the resonators for the housing waves constitute altogether a larger barrier than is the case for highly coupled resonators even if they, in themselves, otherwise have the same oscillation properties. For strong mechanical coupling, the vibration of a resonator is transmitted essentially directly to the adjacent resonator; this is not the case for weak mechanical coupling even if, of course, there is a mechanical interaction between the adjacent resonators here.

In one preferred configuration of the invention, it is provided that the natural frequencies of the resonators are in the frequency range of the housing waves, which guarantees that, as a result of the resonance effect of oscillatory systems, as much energy of the housing waves as possible is bound in the oscillation of the resonators. In the resonators which are implemented with different natural frequencies, housing waves in a wide frequency range can be suppressed; in particular, this is of great importance when broadband ultrasonic signals are being emitted. The weakly coupled mechanical resonators provided in the second region of the housing thus essentially act as a band-stop filter (or several band-stop filters) in the transmission path from the first region of the ultrasonic transducer to the third region of the ultrasonic transducer.

In a further preferred embodiment, it is envisaged that the first area of the housing is designed so that the resonant frequency of the first area of the housing and/or the third sector of the housing—in a reasonable construction—is far removed from the natural frequencies of the weakly coupled resonators in the second part of the housing and thereby maximize the distance from the working frequency of the ultrasound transducer.

Ultrasonic transducers are often made sleeve-like in the second region of the housing in a direction of axial extension, the ultrasonic windows in the first region of the housing closing this sleeve as the end surface toward the medium. The second region of the housing which is made sleeve-like is then generally cylindrical. The third region of the housing which is opposite the first region of the housing can be, for example, in a flange-like connecting piece or also only in the open end region of the sleeve. In an ultrasonic transducer made in this way, the housing waves are transmitted by way of the housing altogether also in the axial direction. According to another preferred configuration of the invention, it is provided that, for ultrasonic transducers made in this way, at least one resonator is made as a hollow ring or as a step, with an upper flat wall, with a lower flat wall, and with an end wall which connects the upper flat wall and the lower flat wall. The configuration of a resonator as a hollow ring or as a step is advantageous because both structures can be produced very easily and with great precision in terms of production engineering, for example, by metal-cutting turning in one piece from solid material. Larger hollow rings, whose cavities, which are bounded by the upper flat wall, the lower flat wall, and the connecting end wall, are very low and extend far in the extension direction of the flat walls, can optionally be produced more easily by a multipart structure.

In one especially preferred configuration of the invention, the hollow rings are aligned essentially in the axial extension direction of the second region of the housing, the second region of the housing then especially having meandering wall cross sections in the region of the hollow rings in the axial extension direction. This description illustrates that a housing wave, in order to travel from the first region of the housing to the third region of the housing, must necessarily traverse the successively connected resonators, therefore necessarily excites the resonators in succession and in any case, with respect to the housing of the ultrasonic transducer, cannot travel past the resonators.

In the above described ultrasonic transducers, it has been found to be especially advantageous if the stiffness, in the axial extension direction, of the end wall of the hollow ring or the step is greater than the stiffness of the first flat wall and/or the stiffness of the second flat wall. This measure results in that oscillation of the resonators in the axial extension direction is very easily possible and can be easily excited. When the resonators—as stated above—are interpreted as a spring-mass system, the end wall is then that component of the resonator which contributes an important part of the mass, and the first flat wall and/or the second flat wall convert essentially the elastic properties of the spring-mass system. In order to achieve weak coupling between the adjacent resonators, it has been found to be especially advantageous if the stiffness of the end wall, viewed in the axial extension direction, is greater by at least one order of magnitude or even by more than two orders of magnitude than the stiffness of the first flat wall and/or the stiffness of the second flat wall.

According to another independent teaching of the invention, the aforementioned object is achieved for the initially described ultrasonic transducer in that the second region of the housing is made sleeve-shaped in one direction of axial extension and in the second region of the housing at least one mechanical resonator is provided, the resonator being configured as a hollow ring or as a step, with an upper flat wall, with a lower flat wall, and with an end wall which connects the upper flat wall and the lower flat wall. The applicant does know from practice two ultrasonic transducers which have a mechanical resonator in the second intermediate region of the housing, but they are made far more complicated and are accordingly more difficult to produce. The configuration of the resonator as a hollow ring or as a step is, conversely, very simple in terms of production engineering, and thus, can be economically implemented, and the spring-mass parameters—resonant frequency, attenuation, and thus, quality—of this oscillatory system can be very easily adjusted. The adjustment of the parameters is preferably done by suitable selection of the thickness of the flat walls—spring constants—and the thickness of the end wall—mass. All preferred configurations of the weakly coupled resonators are, if applicable, also preferred configurations of the individual resonator.

In particular, there are different possibilities for embodying and developing the ultrasonic transducer in accordance with the invention. In this respect, reference is made to the description of preferred exemplary embodiments in conjunction with the drawings.

DETAILED DESCRIPTION OF THE INVENTION

Figure 1:
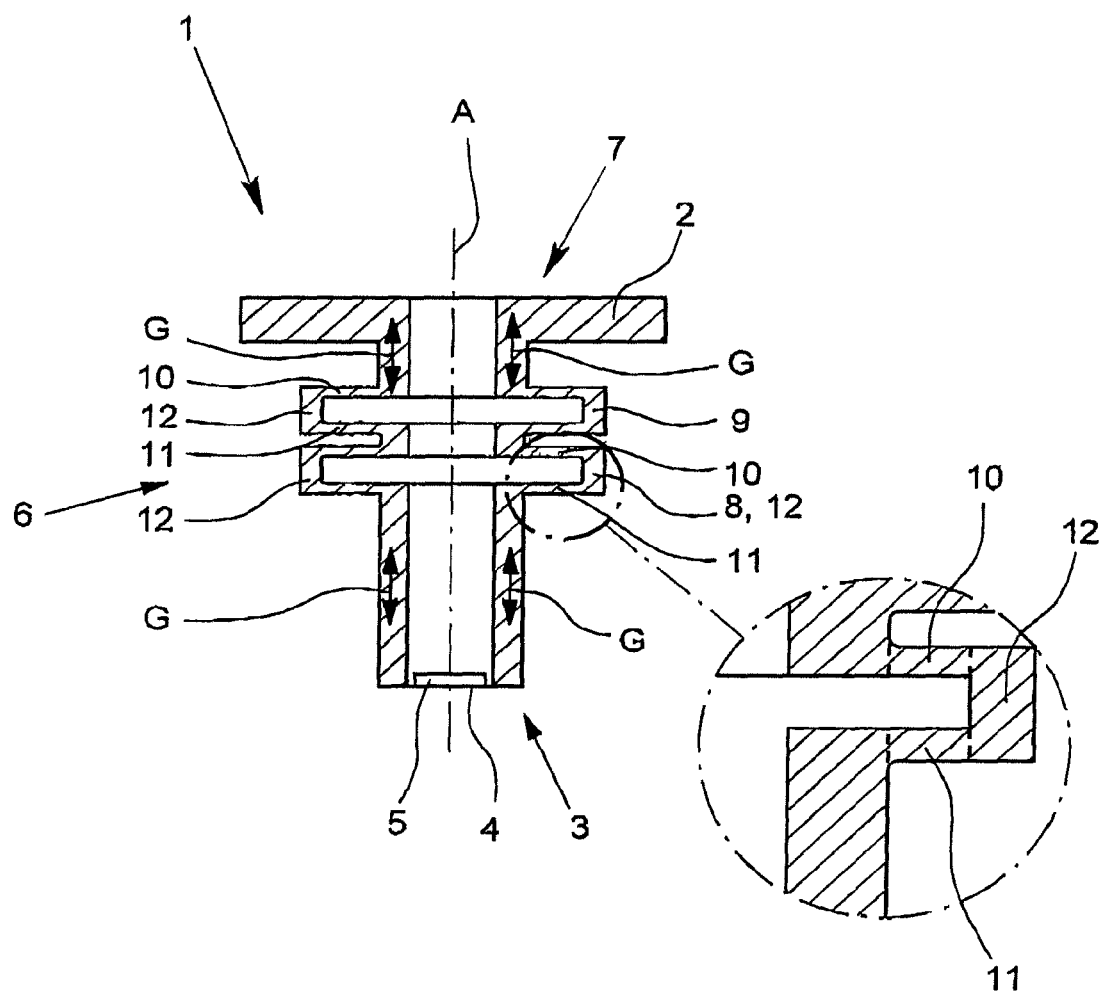
FIG. 1 shows a schematic cross section of an ultrasonic transducer in accordance with the invention with two mechanical resonators and an enlarged detail of a portion thereof.

FIGS. 1 to 7 show ultrasonic transducers 1 with a housing 2 and an ultrasonic window 4 provided in a first region 3 of the housing 2 for transmission of ultrasonic waves between the interior of the ultrasonic transducer 1 and the exterior of the ultrasonic transducer 1; the ultrasonic waves are not described as such.

All illustrated ultrasonic transducers 1 also have a transducer element 5 which is located in the housing 2 adjacent to the ultrasonic window 4 and which, in the illustrated cases, is a piezo crystal. The figures as schematic to the extent that they show the elements which are necessary for understanding of this invention; thus, for example, the description of the electrical cabling necessary for excitation of the transducer element 5 and for readout of electrical signals from the transducer element 5 can be completely omitted as such aspects are conventional and well known. Nor is the exact structure of the first region 3 of the housing 2 or the configuration of the ultrasonic window 4 explained in detail; both can be made very complex, but this is not of fundamental importance here. Nor is it important here whether the housing 2 of the ultrasonic transducer 1 is made in one piece or several pieces in the first region 3; different versions are possible and different configurations are known from the prior art.

In the case of an ultrasonic transducer 1 which works as a transmitter, the main objective of this ultrasonic transducer 1 is to transmit the ultrasonic waves produced by the transducer element 5 from the interior of the housing 2 by way of the ultrasonic window 4 to the exterior of the ultrasonic transducer 1. Here, it is of great interest to transmit a portion of the energy used for excitation of the transducer element 5 that is as large possible in the form of ultrasonic waves to the exterior of the housing 2 since the actual useful signal is thus largest and a good signal-to-noise ratio is achieved.

However, it cannot be avoided that some of the ultrasonic waves are transmitted and can be transmitted as housing waves G between the first region 3 of the housing 2 by way of an intermediate second region 6 of the housing 2 and a third region 7 of the housing 2 that is opposite the first region 3 of the housing 2. These housing waves G not only reduce the power available to the useful signal which is actually of interest, but they can also be transmitted on to other components of the measurement set-up (which are not explained here) and as crosstalk can overlie the directly transmitted useful ultrasonic waves elsewhere; this makes evaluation of the useful ultrasonic waves difficult.

The third region 7 of the housing 2 in all illustrated embodiments is made as a flange. FIG. 1 shows all possible transmission directions of the housing waves G, the double arrows illustrating that the housing waves G can radiate not only proceeding from the first region 3 of the housing 2, but also can be coupled into the third region 7 of the housing 2 and can propagate by way of the intermediate second region 6 of the housing to the first region 3 of the housing 2.

The illustrated ultrasonic transducers 1 are characterized in that, in the second region 6 of the housing 2, two weakly coupled mechanical resonators 8, 9 are formed which are located in succession in the propagation direction of the housing waves G. In the illustrated embodiments, the mechanical resonators 8, 9 are made in the housing 2 because this forces the housing waves G to have to run over and through the resonators 8, 9 in order to travel from the first region 3 of the housing 2 into the third region 7 of the housing 2 and vice versa. As soon as the housing waves G reach the mechanical resonators 8, 9, their energy is accumulated at least partially in the resonators 8, 9, since the mechanical resonators 8, 9 are excited into oscillations. Thus, it is possible to initially, at least partially, localize the energy transmitted with the housing waves G. This achieves the objective of the housing waves G being unable to travel unobstructed from one end of the housing 2 to the other end of the housing 2 of the ultrasonic transducer 1. The energy is first "caught" in the resonators 8, 9 and then released again time-delayed over a longer time interval; the signal-to-noise ratio is thus greatly improved. Since each real resonator is also damped, part of the energy of the housing waves G in the resonators 8, 9 is converted into heat, in any case no longer released as energy in the form of ultrasonic waves.

The behavior of the resonators 8, 9 is especially advantageous in those applications in which the ultrasonic transducer 1 or the transducer element 5 is periodically excited in pulses, especially at those intervals in which the resonator oscillations have decayed again.

The ultrasonic transducers 1, which are shown in FIGS. 1 to 7, have mechanical resonators 8, 9 whose natural frequencies are in the frequency range of the housing waves G. In this way, it is possible to selectively catch frequency portions of the housing waves G or to attenuate their transmission from the first region 3 of the housing 2 to the third region 7 of the housing 2 and vice versa.

As can be seen in FIGS. 1 to 7, the second intermediate region 6 of the housing 2 is sleeve-shaped in the axial extension direction A, the housing waves G in the housing 2 of the ultrasonic transducer 1 also essentially propagating in the axial extension direction A. In FIGS. 1 to 4, 6 & 7, the two illustrated resonators 8, 9 are made as a hollow rings, each resonator 8, 9 having an upper flat wall 10, a lower flat wall 11 and an end wall 12 which connects the upper flat wall 10 and the lower flat wall 11. The end wall 12 connects the upper flat wall 10 and the lower flat wall 11 peripherally so that the housing 2 of the illustrated ultrasonic transducers 1 is entirely sealed when the housing 2 is closed in the third region 7 by a suitable connection (not shown).

Figures 3, 4, 5:
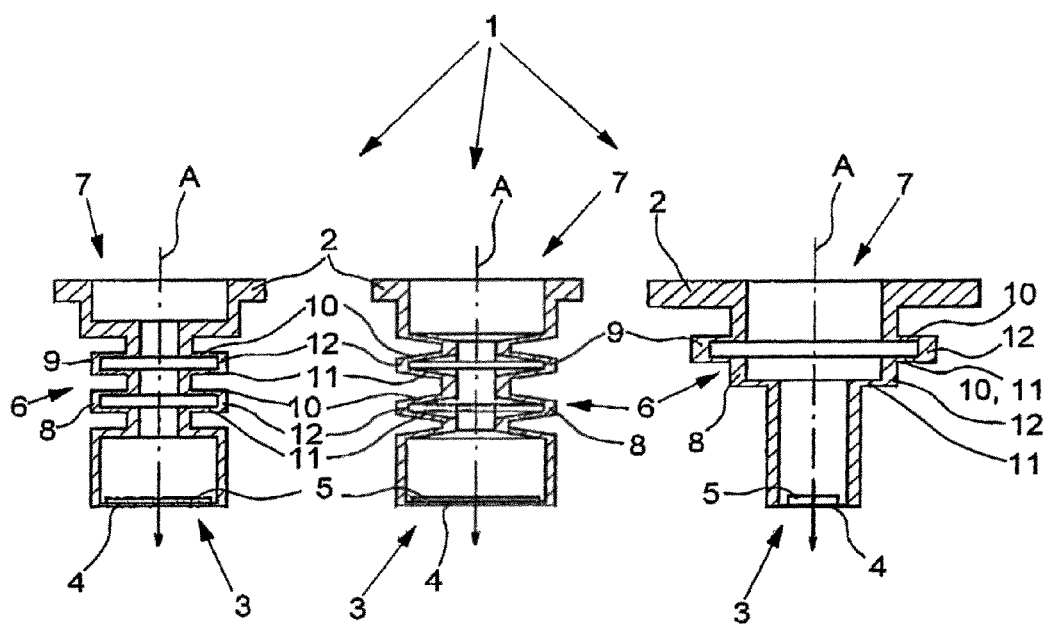
FIG. 3 shows a schematic cross section of another embodiment of the ultrasonic transducer in accordance with the invention.
FIG. 4 shows a schematic cross section of yet another ultrasonic transducer in accordance with the invention with tapering resonators.
FIG. 5 shows a schematic cross section of still another ultrasonic transducer in accordance with the invention with a step-shaped resonator.

FIG. 5 shows an ultrasonic transducer 1 which has a resonator 8 which is made as a step and a resonator 9 which is made as a hollow ring. Viewed in the axial extension direction A, the resonator 8, which is made as a step, produces a reduction of the diameter of the housing which is made sleeve-like while the upper flat wall 10 and the lower flat wall 11 of the resonator 9 produces a widening. In the resonator 9, made as a hollow ring, in the axial extension direction A, the upper flat wall 10 and the lower flat wall 11 are located opposite one another.

In FIGS. 1 to 7, the resonators which are made as hollow rings have in common in that they are aligned essentially in the axial extension direction A of the second region 6 of the housing 2 when it is assumed that the surface normal which characterizes the orientation of the hollow rings is perpendicular on the plane in which the flat side of each hollow ring lies. This surface normal in the illustrated embodiments is congruent with and coaxial to the center line represented by the axial extension direction A in the figures. The second region of the housing 2, in the region of the hollow rings, accordingly, has wall cross sections which run in a meander shape in the axial extension direction A. It is important that there is no direct connection between the first region 3 of the housing 2 and the third region 7 of the housing 2 on which the resonators 8, 9 are more or less "suspended" since, in these cases, the resonators could not be effectively used because the housing waves G could more or less "brush" along the resonators made in such a way. In the illustrated embodiments, the housing waves G must essentially pass through the mechanical resonators 8, 9.

The embodiments are schematically shown in FIGS. 1 to 7 which are not necessarily to scale. In particular, in the figures, it is not shown to scale in which ratio the thickness of the upper flat wall 10 and the lower flat wall 11 is to the thickness of the connecting end wall 12. In fact, the ultrasonic transducers 1 in the exemplary embodiments are made such that, in the axial extension direction A, the stiffness of the end wall 12 is greater than the stiffness of the upper flat wall 10 and the stiffness of the lower flat wall 11. In these cases, the stiffnesses of these elements of the resonators 8, 9 differ by roughly a factor of 300, specifically, the stiffness of the end wall 12 is roughly 300 times greater than the stiffness of the upper flat wall 10 and the stiffness of the lower flat wall 11 of each resonator 8, 9. This results in that the resonators 8, 9 are especially oscillatory in the axial extension direction A of the housing 2, and thus, in the direction in which the housing waves G run.

Suitable dimensioning of the upper flat wall 10 and the lower flat wall 11 relative to the connecting end wall 12 is very simple by using the planar moments of inertia of the second order of the base body to compute the stiffnesses of these elements with respect to the axial extension direction A. In the case of the upper flat wall 10 and the lower flat wall 11, it is a circular ring disk clamped on the periphery and in the case of the connecting end wall 12, a beam, in simplified terms.

Figures 2A, 2B:
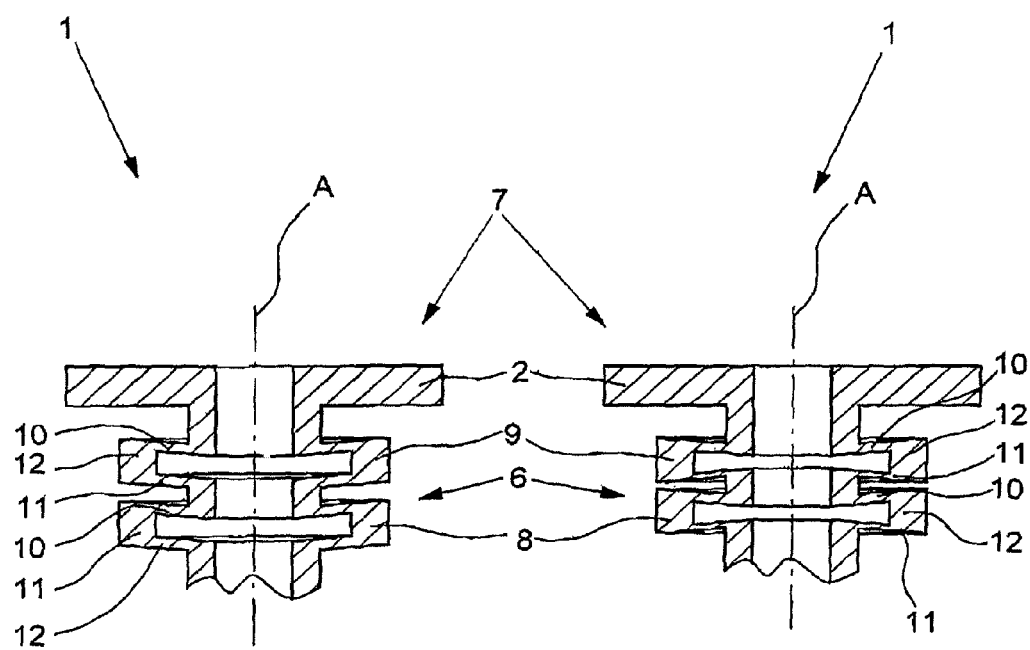
FIGS. 2*a*, 2*b* show an extract from the schematic cross section of an ultrasonic transducer in accordance with the invention in different excitation modes.

FIGS. 2a & 2b each show an ultrasonic transducer 1 with two resonators 8, 9, the resonators 8, 9 being in the oscillating state. In FIG. 2a, the resonators 8, 9 are excited in the first oscillation mode—the upper flat wall 10 and the lower flat wall 11 oscillate in the same direction—, conversely the resonators 8, 9 in FIG. 2b are excited in the second oscillation mode, therefore the upper flat wall 10 and the lower flat wall 11 each move opposite one another.

Figures 6, 7:
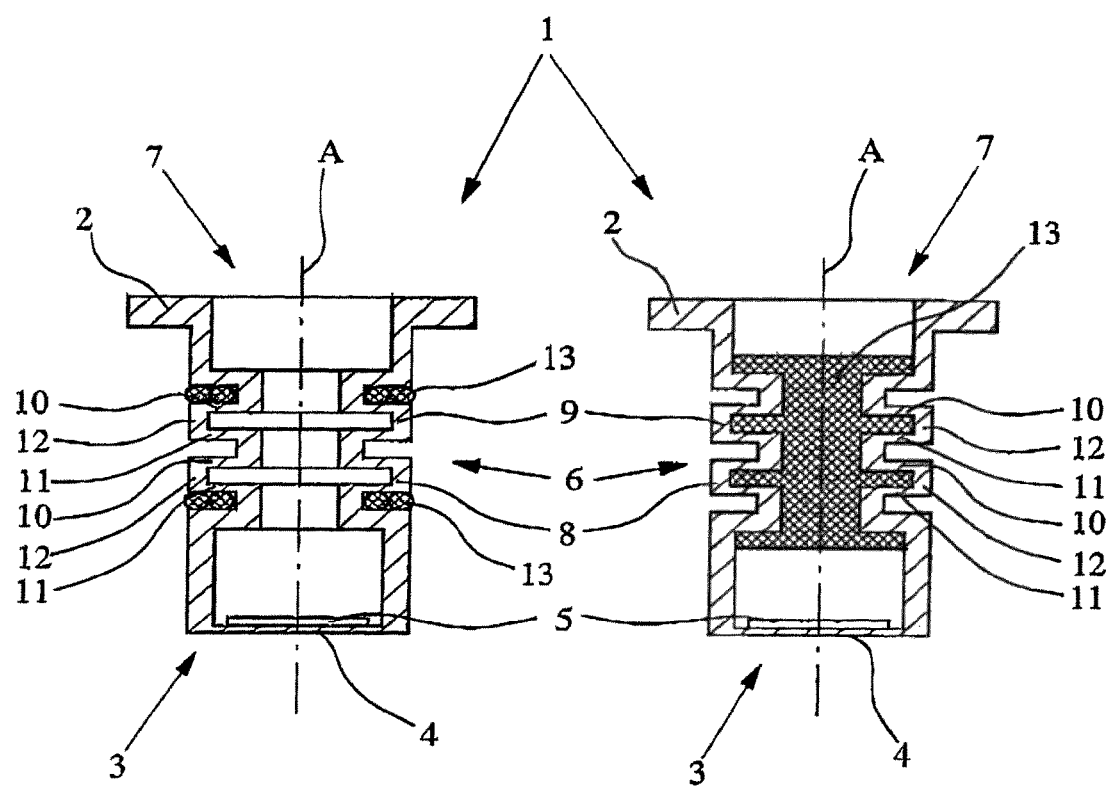
FIG. 6 shows a schematic cross section of another ultrasonic transducer in accordance with the invention with O-rings as the attenuation element.
FIG. 7 shows a schematic cross section of another ultrasonic transducer in accordance with the invention with a potting mass as the attenuation element.

The resonators 8, 9 of the ultrasonic transducers 1 as shown in FIGS. 6 & 7 are damped. In the embodiment as shown in FIG. 6, in the outer region of the housing 2 of the ultrasonic transducer 1, attenuator elements 13 are provided by O-rings, that are not located between the resonators 8, 9, each being located between one of the resonators 8, 9 and the adjacent housing part. In this way, amplification of the coupling between the resonators 8, 9 is avoided with simultaneous effective damping of the respective resonator oscillations. Essentially elastic material is used for the O-rings, specifically an elastomer.

In FIG. 7, the attenuator element 13 is formed by a potting mass which fills the resonators 8, 9 and the cavities of the resonators 8, 9 which are made as hollow rings. The coupling between the resonators 8, 9 is not amplified by this attenuator element 13 either. Viscoelastic material is suitable as the attenuator element 13 as long as it can be ensured that it cannot be displaced out of the resonators 8, 9 or the intermediate spaces between the resonators.

What is claimed is:

1. Ultrasonic transducer, comprising:
   a housing having a first region, at least one intermediate second region, and a third region on an opposite side of the at least one intermediate second region from the first region,
   an ultrasonic window provided in the first region of the housing for transmitting ultrasonic waves between the interior of the ultrasonic transducer and the exterior of the ultrasonic transducer, and
   a transducer element located in the housing adjacent to the ultrasonic window,
   wherein at least two weakly coupled mechanical resonators are provided in the second region of the housing and are arranged essentially in secession in a propagation direction of housing waves through the housing from the first region to the third region via the at least one intermediate second region.

2. Ultrasonic transducer in accordance with claim 1, wherein the resonators have natural frequencies in a frequency range of the housing waves.

3. Ultrasonic transducer in accordance with claim 1, wherein the second region of the housing is made sleeve-shaped in the direction of axial extension and at least one of the resonators is a hollow ring with an upper flat wall, with a lower flat wall, and with an end wall which connects the upper flat wall to the lower flat wall.

4. Ultrasonic transducer in accordance with claim 3, wherein one of the resonators is step-shaped.

5. Ultrasonic transducer in accordance with claim 3, wherein the hollow rings are aligned essentially in the axial extension direction of the second region of the housing, forming meandering wall cross sections in the region of the hollow rings in the direction of axial extension.

6. Ultrasonic transducer in accordance with claim 3, wherein in the direction of axial extension direction, the stiffness of the end wall is greater than the stiffness of at least one of the upper flat wall and the lower flat wall by at least one order of magnitude.

7. Ultrasonic transducer in accordance with claim 1, wherein at least one of the resonator is damped by at least one attenuator element which is located at least one of in one of the resonators, between the resonators and adjacent to one of the resonators.

8. Ultrasonic transducer in accordance with claim 6, wherein the at least one attenuator element is one of at least one O-ring and a potting mass of an elastic or viscoelastic material.

9. Ultrasonic transducer with a housing according to claim 3, wherein the second region of the housing is sleeve-shaped in the direction of axial extension.

10. Ultrasonic transducer in accordance with claim 4, wherein the second region of the housing is sleeve-shaped in the direction of axial extension.

11. Ultrasonic transducer in accordance with claim 1, wherein one of the resonators is step-shaped.

* * * * *